(12) United States Patent
Poffet et al.

(10) Patent No.: US 9,321,226 B2
(45) Date of Patent: Apr. 26, 2016

(54) METHOD FOR MECHANICAL AND/OR OPTICAL FUNCTIONALIZATION OF A TRANSPARENT TIMEPIECE COMPONENT

(71) Applicant: ETA SA Manufacture Horlogere Suisse, Grenchen (CH)

(72) Inventors: Christian Poffet, Giffers (CH); Philipp Gaechter, Itingen (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 206 days.

(21) Appl. No.: 14/349,526

(22) PCT Filed: Oct. 2, 2012

(86) PCT No.: PCT/EP2012/069471
§ 371 (c)(1),
(2) Date: Apr. 3, 2014

(87) PCT Pub. No.: WO2013/050372
PCT Pub. Date: Apr. 11, 2013

(65) Prior Publication Data
US 2014/0242273 A1      Aug. 28, 2014

(30) Foreign Application Priority Data

Oct. 4, 2011   (EP) .................................... 11183804

(51) Int. Cl.
*B29D 11/00*   (2006.01)
*G04B 3/04*    (2006.01)
(Continued)

(52) U.S. Cl.
CPC ........ *B29D 11/0073* (2013.01); *B29C 45/1679* (2013.01); *B29D 11/00865* (2013.01); *G04B 3/04* (2013.01); *G04B 15/14* (2013.01); *G04B 29/027* (2013.01); *G04B 31/016* (2013.01);
(Continued)

(58) Field of Classification Search
None
See application file for complete search history.

(56) References Cited

U.S. PATENT DOCUMENTS

| 2,663,910 A | 12/1953 | Danielson et. al. |
| 4,151,707 A | 5/1979 | Cobelli |

(Continued)

FOREIGN PATENT DOCUMENTS

| DE | 2 318 395 | 10/1974 |
| DE | 195 40 333 | 4/1997 |

(Continued)

OTHER PUBLICATIONS

International Search Report Issued May 10, 2013 in PCT/EP12/069471 Filed Oct. 2, 2012.

*Primary Examiner* — Shamim Ahmed
*Assistant Examiner* — Bradford Gates
(74) *Attorney, Agent, or Firm* — Oblon, McClelland, Maier & Neustadt, L.L.P.

(57) ABSTRACT

A method for mechanical and/or optical functionalization of a transparent timepiece component, including: forming a body of methyl polymethacrylate, including a bottom surface and a mechanical and/or optically functionalized intermediate surface; coating the body with a layer made by injecting a second transparent polymerizable material into a cavity between a mold and the body or an intermediate body delimited by a complementary intermediate surface of a contact surface of a preceding mold, the last mold being the negative of the top surface of the component; polymerizing the second material therein; removing the component from the flexible mold by deformation of the mold. Hardness can be improved by UV irradiation of a component.

17 Claims, 2 Drawing Sheets

(51) Int. Cl.
*B29C 45/16* (2006.01)
*G04B 39/00* (2006.01)
*G04B 45/00* (2006.01)
*G04B 15/14* (2006.01)
*G04B 29/02* (2006.01)
*G04B 31/016* (2006.01)

(52) U.S. Cl.
CPC .......... *G04B 39/006* (2013.01); *G04B 45/0076* (2013.01); *B29C 2045/166* (2013.01); *B29K 2995/0026* (2013.01)

(56) References Cited

U.S. PATENT DOCUMENTS 6,103,166 A    8/2000  Boehm et al.
6,342,019 B1   1/2002  Boehm et al.
2006/0118999 A1  6/2006  Cooper et al.
2010/0167045 A1* 7/2010  Schultes ............. B29C 45/1679
                                                    428/335
2010/0310839 A1  12/2010  Rey et al.

FOREIGN PATENT DOCUMENTS

| EP | 1 666 225 | 6/2006 |
| FR | 2 360 113 | 2/1978 |
| JP | 58 80587 | 5/1983 |
| JP | 61 239189 | 10/1986 |
| JP | 11 223680 | 8/1999 |

\* cited by examiner

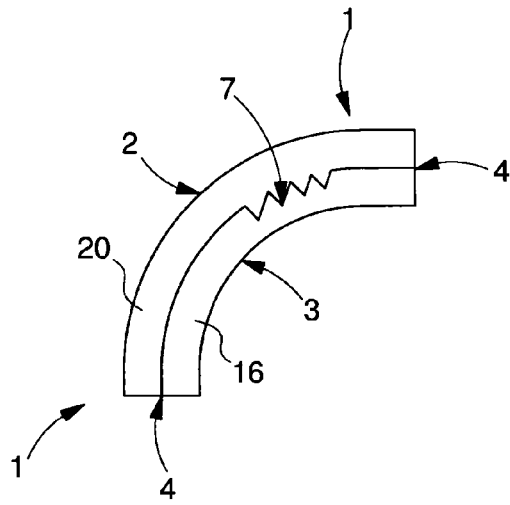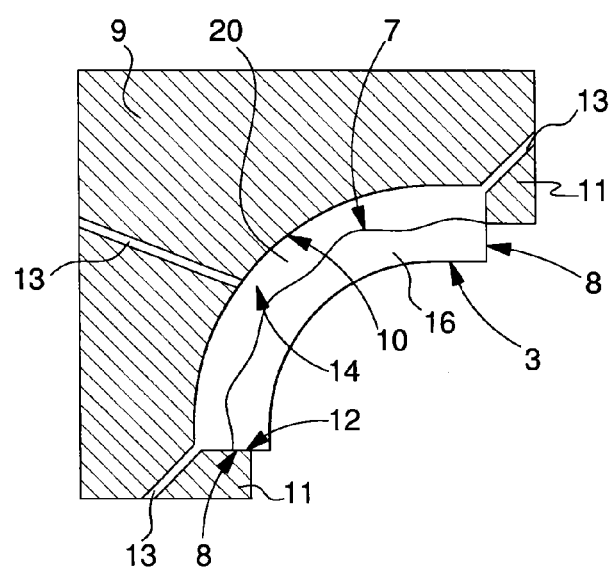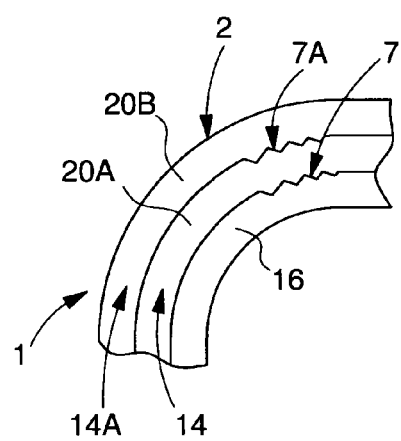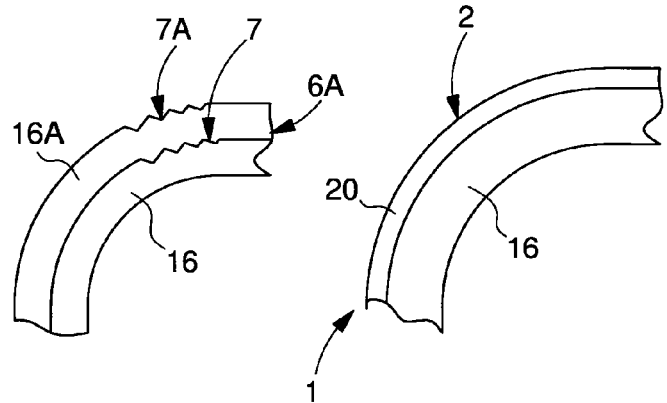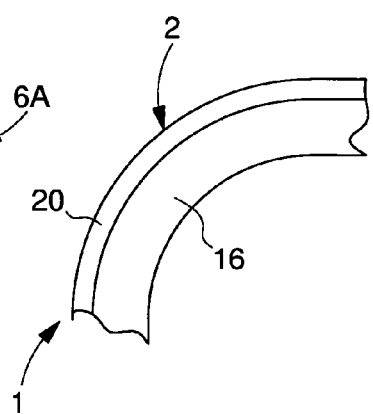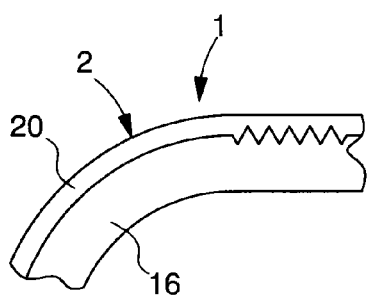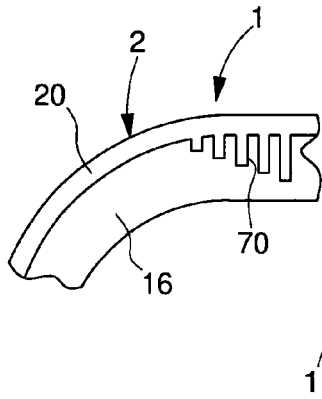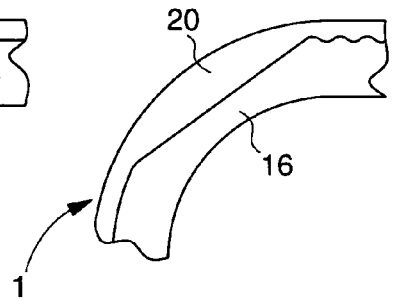

METHOD FOR MECHANICAL AND/OR OPTICAL FUNCTIONALIZATION OF A TRANSPARENT TIMEPIECE COMPONENT

CROSS-REFERENCE TO RELATED APPLICATIONS

This is a National phase application in the United States of International Patent Application PCT/EP2012/069471 filed Oct. 2, 2012 which claims priority on European Patent Application No. 11183804.1. filed Oct. 4, 2011. The entire disclosures of the above patent applications are hereby incorporated by reference.

FIELD OF THE INVENTION

The invention concerns a method for forming a transparent, one-piece timepiece component including a top surface and a bottom surface connected by an edge, said edge extending in the thickness of said component.

The invention also concerns the application of this method to the making of a timepiece component.

The invention further concerns a timepiece movement including at least one component made according to this method.

The invention further concerns a timepiece including at least one component made according to this method.

BACKGROUND OF THE INVENTION

The substitution of transparent components of mineral origin with transparent components made of moulded plastic material provides a functional alternative at low production cost, and complete independence from certain supply sources of up-market transparent materials.

However, moulded transparent parts are, on the one hand, relatively thick since it is difficult to mould very thin parts with adequate reproducible quality. On the other hand, the wear resistance, and particularly scratch resistance of these known plastic materials is very mediocre. The use thereof for the external components of timepieces—the middle part of the case, bezel or crystal—is thus limited in time.

This low wear resistance also makes it impossible to produce components with sharp angles, which would become blunt too quickly over time on contact with the user, his clothes, and ordinary everyday objects.

It is useful, in horology, to have components having a high surface hardness, in particular for those external timepiece components, which are subject to stresses from the environment and the user. These components must also have certain physical properties of elasticity, rigidity or conversely flexibility, or particular optical properties, to enhance certain displays or components, or conversely to conceal certain parts of the timepiece.

EP Patent No 1666225 in the name of BAYER MATERIAL SCIENCE CLC describes a method for fabricating a plastic component which is moulded in a first chamber, and coated in a second cavity of the mould, in which the coating material is compressed.

JP Patent Application No 58080587A in the name of SUWA SEIKOSHA describes an improvement to watch cases, in terms of resistance and dimensional precision, by the use of fibre glass treated with acrylic silane and mixed with a synthetic UV hardening resin, such as spirane resin, with a photo-polymerisation initiator agent such as benzophenone. These watch cases are moulded in elastic synthetic rubber or silicon moulds, which are fixed to glass plates and then UV-irradiated for 30 seconds to 30 minutes depending on the intensity of radiation.

SUMMARY OF THE INVENTION

The invention proposes to implement a method for obtaining, in an economical manner and with high dimensional precision, transparent one-piece timepiece components.

More particularly, it is an object of the invention to produce a component of this type, with a higher surface hardness than that of the timepiece components usually obtained by moulding plastic materials.

A particular object is also to make external timepiece parts, which include sharp angles, for example with a facet cut or diamond cut, and are resistant to wear.

The invention therefore concerns a method for the fabrication and mechanical and/or optical functionalization of an optically transparent timepiece component including a top surface and a bottom surface connected by an edge, said edge extending in the thickness of said component, characterized in that:

a first material is chosen from among the acrylic polymer family, or Cover Form® by Evonik Röhm®, or Nanocryl® by Hanse Chemie®, or a methyl polymethacrylate, for forming a basic body;

at least a second polymerisable moulding material is chosen for making at least one layer of said component, from among the acrylic polymer family, or Cover Form® by Evonik Röhm®, or Nanocryl® by Hanse Chemie®, a basic body of said component is shaped, in said first material, said basic body being of smaller volume than that of said component and extending between said bottom surface and an intermediate surface connected by an intermediate edge, and mechanical and/or optical functionalization and structuring is performed, either during the shaping of said basic body in a suitable mould, or during re-machining after said shaping;

a number of layers to be superposed on said basic body to obtain a said component is defined;

for each said layer, a mould is made having a contact surface which is either the negative of said top surface, or a surface delimiting a solid of smaller internal volume than the final volume of said component, said mould including an edge having a bearing surface arranged to cooperate in a complementary manner in abutment on said intermediate surface or on said intermediate edge, and, in the case of a plurality of said moulds, the latter each define the external volume of an intermediate body delimited by a complementary intermediate surface of said contact surface of said mould concerned, said intermediate volumes being incorporated in each other;

at a distance from said intermediate surface corresponding to the thickness required for said component, and exactly positioned in relation to said intermediate surface, said mould is positioned with said contact surface thereof facing said intermediate surface of said basic body, with said bearing surface in sealed contact with said intermediate surface or with said intermediate edge;

said second moulding material is injected, so as to completely fill with said second moulding material a cavity delimited by said contact surface of said mould, said intermediate surface of said basic body, and said edge in sealed abutment via said bearing surface thereof on said intermediate surface or on said intermediate edge;

said second material injected into said cavity is left to polymerise until polymerisation, to obtain, depending on the case, either a said component, or an intermediate body delimited by a complementary intermediate surface of said contact surface of said transparent mould;

said mould is removed;

the operation is repeated each time with a new mould whose internal volume is greater than the volume of said intermediate body obtained by said preceding mould, until the obtention of said component with its final volume.

According to a feature of the invention, second material is chosen, either as model composition where said second material includes, as a proportion of the total:

trimethylolpropane tri(methacrylate): 78.0%
pentaerythrityl tetraacrylate: 19.5%
bis(4-tert-butylcyclohexyl) peroxydicarbonate: 0.5%
1-benzoylcyclohexanol: 2.0%, or the Cover Form® material by Evonik Röhm® is chosen as second polymerisable, moulding material for making said component.

According to a feature of the invention, a methyl polymethacrylate is chosen as said first material.

According to a feature of the invention, each flexible mould 9 is preferably made of PDMS® material According to a feature of the invention, said second material injected into said cavity is subjected during polymerisation to a temperature comprised between 100° C. and 120° C. for 10 to 20 seconds.

According to a feature of the invention, after the injection of said second moulding material, said intermediate body or said component is irradiated by ultraviolet radiation, either through said mould made in the form of a mould transparent to ultraviolet radiation or after the removal of said intermediate body or of said polymerised component from said cavity, to obtain improved hardness of said intermediate body or of said rigid component.

According to a feature of the invention, said first moulding material is chosen to be transparent to ultraviolet radiation, and said intermediate body or said component is irradiated by ultraviolet radiation through said basic body, in addition to said irradiation through said transparent mould to obtain improved hardness of said intermediate body or of said rigid component.

According to another feature of the invention, a tightening force is applied to said mould and to said basic body during the injection of said second moulding material into said cavity, and during polymerisation of said second moulding material to form said component.

According to a feature of the invention, the injection of said first moulding material is performed at a pressure of more than 100 MPa.

According to a feature of the invention, optical functionalization structuring is performed on said intermediate surface, by creating striated sectors forming anisotropic optical diffusers.

According to a feature of the invention, mechanical functionalization structuring is performed on said intermediate surface by forming mortises and/or tenons substantially parallel to each other and substantially perpendicular to a plane tangent to said bottom surface or to said intermediate surface on the intersection between the extension of said mortises and tenons and the surface concerned.

According to a feature of the invention, mechanical functionalization structuring is performed on said intermediate surface by forming smaller sections of said basic body in the areas of strong curvature than in the areas of lower curvature.

According to a feature of the invention, mechanical functionalization structuring is performed on said intermediate surface by forming areas of variable thickness of said component in the areas of lower curvature thereof.

According to a feature of the invention, at least one particular layer among the layer or layers covering said basic body is structured, and at least one said intermediate surface, so as to conceal or reveal said particular layer, according to the incident angle of observation of said component by a user.

The invention further concerns the application of this method to a timepiece component selected from among: the crystal, crown, middle part of the case, main plate, bridge, wheel, escape wheel, pallets, bearing housing, shock absorber.

The invention further concerns a timepiece movement including at least one component made according to this method.

The invention further concerns a timepiece including at least one component made according to this method.

BRIEF DESCRIPTION OF THE DRAWINGS

Other features and advantages of the invention will appear more clearly upon reading the following detailed description, with reference to the annexed drawings, in which:

FIG. 2 shows a schematic cross-section through the thickness of a component obtained according to the method, in an embodiment wherein a layer is deposited on a basic body.

FIG. 3 shows a schematic cross-section through the thickness of the component of FIG. 2 and substantially perpendicular to the main surfaces thereof, with one piece of the equipment in the configuration thereof adopted during the shaping of the component.

FIG. 4 shows, in a similar manner to FIG. 2, a variant wherein the component includes two superposed layers of a basic body.

FIG. 5 shows, in a similar manner to FIG. 2, another variant wherein an intermediate surface between the basic body and a coating layer is substantially smooth, and wherein the thickness of said coating layer is substantially constant.

FIG. 6 shows, in a similar manner to FIG. 2, another variant wherein an intermediate surface between the basic body and a coating layer is striated.

FIG. 7 shows, in a similar manner to FIG. 2, another variant wherein an intermediate surface between the basic body and a coating layer includes alternating mortises and tenons.

FIG. 8 shows, in a similar manner to FIG. 2, another variant wherein an intermediate surface between the basic body and a coating layer is locally crimped and wherein the coating layer is of variable thickness.

DETAILED DESCRIPTION OF PREFERRED EMBODIMENTS

Figure 1:
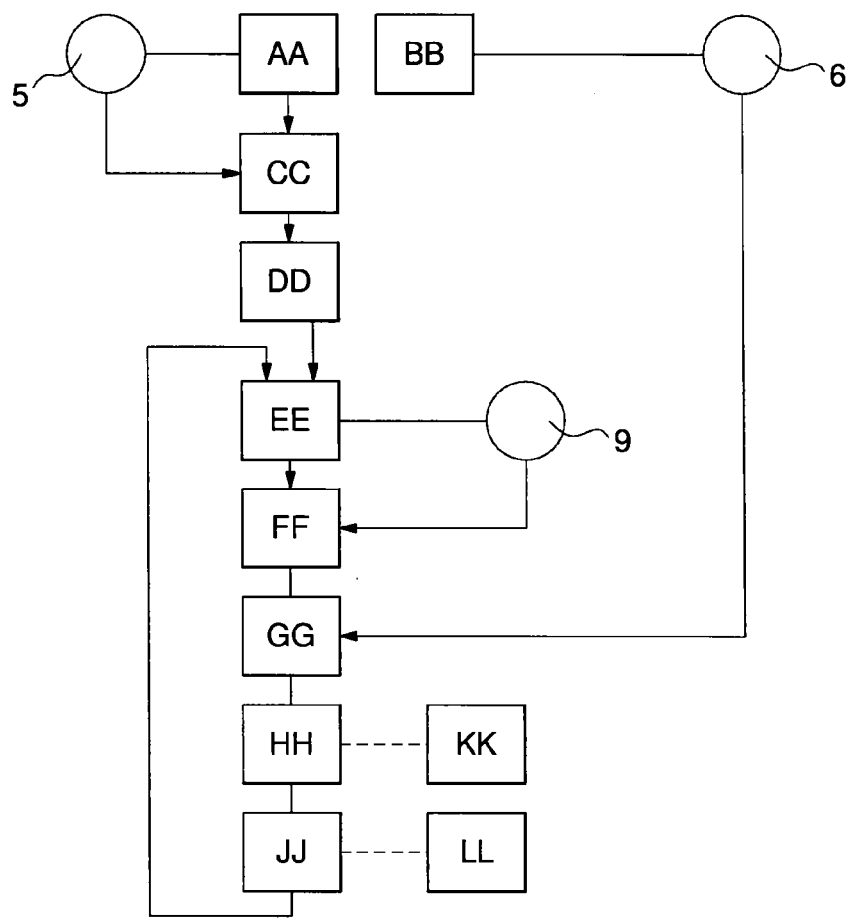
FIG. 1 shows a schematic flow chart of the series of operations for implementation of the method.

The invention proposes to implement a method for obtaining, in an economical manner and with high dimensional precision, transparent, one-piece timepiece components 1.

More particularly, it is an object of the invention to produce a component 1 of this type, with a higher surface hardness than that of the timepiece components usually obtained by moulding plastic materials.

The invention consists in coating a basic body 16, which is preferably transparent, with one or more layers 20, 20A, . . . , having good affinity with basic body 16 as regards those directly in contact with the basic body, and having good affinity with each other as regards those which are juxtaposed. The choice of a first material 5 suitable for basic body 16 and of a second material 6 suitable for each of layers 20 coating the basic body or totally or partially coating each other, is therefore of great importance.

Preferably, an optically transparent first material 5 will be chosen from among the acrylic polymer family, or Cover Form® by Evonik Röhm®, or Nanocryl® by Hanse Chemie®, or a methyl polymethacrylate.

According to the invention, at least one second polymerisable moulding material 6 is chosen for making said component 1 from among the acrylic polymer family, or Cover Form® by Evonik Röhm®, or Nanocryl® by Hanse Chemie®.

An essential step method consists in selecting the second moulding material 6.

Generally, this second material 6 includes acrylic monomers, at least one thermal initiator, at least one UV initiator and at least one cross-linking agent which may be formed by at least one of the acrylic monomers. It may also include one or more additives, which will be detailed below.

More specifically, this second material 6 includes a mixture of acrylic monomers including at least one monomer having a functionality greater than or equal to 2, at least one thermal initiator, and at least one photochemical initiator. Here too, the material may include one or more additives.

Even more specifically, this second material 6 includes, as a proportion of the total:
  a mixture of acrylic monomers having a functionality greater than or equal to 2: 50-97.5%
    at least one thermal initiator: 0.5-3%
    at least one photochemical initiator: 0.5-3%
    at least one additive: 0-50%.

In an even more specific composition, this second material 6 includes, as a proportion of the total:
  a mixture of trimethylolpropane tri(methacrylate) and pentaerythrityl tetraacrylate: 50-97.5%
    bis(4-tert-butylcyclohexyl) peroxydicarbonate: 0.5-1.5%
    1-benzoylcyclohexanol: 0.7-2.3%
    at least one additive 0-50%

In a preferred composition, which will be referred to hereinafter as model composition CT of second material 6, this second material 6 includes, as a proportion of the total:
  trimethylolpropane tri(methacrylate): 78.0%
  pentaerythrityl tetraacrylate: 19.5%
  bis(4-tert-butylcyclohexyl) peroxydicarbonate: 0.5%
  1-benzoylcyclohexanol: 2.0%

As regards those compositions of second material 6 which include additives, which are within a range of 0-50% of the total of second material 6, these additives may include, as a percentage of the total of said second material:
  a Antistatics:
    a Copolymer polyamide-polyether: 0-15% preferably from 10-15%
    b Ethylenic ionomer resin: 0-30% preferably from 10-30%
    c Trineoalkoxy Zirconate: 0-30% preferably from 10-30%
  b Conductors:
    a Conductive nanoparticles: gold, carbon nanotubes, silver, antimony tin oxide alloy, zinc aluminium oxide alloy, indium tin oxide alloy, zinc gallium oxide alloy: 0-30% preferably from 10-30%
  c Magnetics:
    a Magnetic nanoparticles: magnetite: 0-30% preferably from 5-30%
  d Antibacterials
    a Silver ions: 0-30% preferably from 10-30%
  e Anti-UV:
    a Absorbers: benzotriazole: 0-0.2% preferably from 0.05-0.2%
    b HALS (Hindered Amine Light Stabilizers): 0-0.02% preferably from 0.05-0.2%
  f Antioxidants:
    a Phenolic phosphite; ethylene bis[3,3-bis(3-tert-butyl-4-hydroxyphenyl) butyrate]; pentaerythritol tetrakis (3-(3, 5-di-tert-butyl-4-hydroxyphenyl) propionate): 0-1.5%
  Fire Retardants:
    a Phosphorus derivative: triphenyl phosphate 0-15%
    b Exfoliated montmorillonite: 0-15%
    c Clay nanotubes: 0-15%
  h Lubricants:
    a Silicone acrylate: 0-2% preferably from 0.5-2%
  i Colorants:
    a Anthraquinones: 0-50%
    b Azoics: 0-50%
  j Pigments: 0-50%
  k Adjuvants with controlled delivery: incorporated in the formulation, these adjuvants are gradually released into the operating environment: 0-50%
  l Microcapsules of repair agent, formed of polymerisable liquid of the same nature as the composition concerned, in particular in a model composition CT, the content then being integrated in the total content: 0-50%

It will be noted that the first material 5 for forming basic body 16 can be chosen to be identical to second material 6, in particular formed of model composition CT above.

The invention also concerns the development of a method for the fabrication and mechanical and/or optical functionalization of a transparent timepiece component 1 including top 2 and bottom 3 surfaces connected by an edge 4, the edge 4 extending in the thickness of component 1. This method includes the following steps:

AA: An optically transparent first material 5 for making a basic body 16 will be chosen from among the acrylic polymer family, or formed of model composition CT or Cover Form® by Evonik Röhm®, or Nanocryl® by Hanse Chemie®, or a methyl polymethacrylate.

BB: At least a second polymerisable moulding material 6 for making one or more layers 20 of component 1 is chosen from among the acrylic polymer family, or formed of model composition CT, or Cover Form® by Evonik Röhm®, or Nanocryl® by Hanse Chemie®.

CC: A basic body 16 of component 1 is shaped, in first material 5, basic body 16 being of smaller volume than that of component 1 and extending between bottom surface 3 and an intermediate surface 7 connected by an intermediate edge 8, and mechanical and/or optical functionalization and structuring of intermediate surface 7 is performed, either when basic body 16 is shaped in a suitable mould, or during re-machining after shaping;

DD: A number of layers 20 to be superposed on basic body 1 to obtain a component 1 is defined;

EE: For each said layer, a mould 9 is made having a contact surface 10 which is either the negative of top surface 2, or a surface delimiting a solid of smaller internal volume than the final volume of component 1, mould 9 including an edge 11 having a bearing surface 12 arranged to cooperate in a complementary manner in abutment on intermediate surface 7 or on intermediate edge 8, and, in the case of a plurality of moulds 9, the latter each define the external volume of an intermediate body 6A delimited by a complementary intermediate surface 7A of contact surface 10 of the mould 9 concerned, the intermediate volumes 6A being incorporated in each other;

FF: At a distance from intermediate surface 7 corresponding to the thickness required for component 1, and exactly positioned in relation to intermediate surface 7, mould 9 is positioned with the contact surface 10 thereof facing intermediate surface 7 of basic body 16, with bearing surface 12 in sealed contact with intermediate surface 7 or with intermediate edge 8;

GG: Second moulding material 6 is injected, so as to completely fill with second moulding material 6 a cavity 14 delimited by contact surface 10 of mould 9, intermediate surface 7 of basic body 16, and edge 11 in sealed abutment via bearing surface 12 thereof on intermediate surface 7 or on intermediate edge 8;

HH: Second material 6 injected into cavity 14 is left to polymerise until polymerisation, to obtain, depending on the case, either a component 1, or an intermediate body 6A delimited by a complementary intermediate surface 7A of contact surface 10 of transparent mould 9;

JJ: Mould 9 is removed;

the operation is repeated each time with a new mould 9 whose internal volume is greater than the volume of the intermediate body 6A obtained by said preceding mould, until the obtention of component 1 with its final volume.

In preferred variant implementation:

a basic body 16 is formed of methyl polymethacrylate (PMMA), including said bottom surface 3 and a mechanically and/or optically functionalized intermediate surface 7;

the body is coated with at least one layer 20 made by injection of a second transparent polymerisable material 6 formed of the model composition CT or Cover Form® material, in a cavity 14 between a mould 9 and said basic body 16 or an intermediate body 6A delimited by a complementary intermediate surface 7A of a contact surface 10 of a preceding mould 9, the last mould 9 being the negative of said top surface 2;

second material 6 is polymerised therein to obtain a rigid component 1 resulting from the agglomeration of basic body 1 and the successive layer(s) 20.

component 1 is removed from the plates and from flexible mould 9 by the deformation of said mould.

Hardness is improved by the ultraviolet irradiation of component 1. The preferred implementation of the invention includes this UV irradiation which makes it possible to activate the photochemical initiator so as to react, otherwise the mechanical properties of the finished component 1 are weaker.

Second material 6 is preferably chosen either as model composition CT where second material 6 includes, as a proportion of the total:

trimethylolpropane tri(methacrylate): 78.0%
pentaerythrityl tetraacrylate: 19.5%
bis(4-tert-butylcyclohexyl) peroxydicarbonate: 0.5%
1-benzoylcyclohexanol: 2.0%;

or the Cover Form® material by Evonik Röhm® is chosen as second polymerisable, moulding material 6 for making component 1, to form layer 20 or layers 20 of component 1. This material is derived from the combination of two components: a liquid reactive referenced 30A and a liquid initiator referenced 30B.

A methyl polymethacrylate is preferably chosen as first material 5.

Indeed, once polymerised and in particular after a heat treatment KK at a temperature of less than 130° C., close to 110° C. and further after an ultraviolet (hereinafter "UV") irradiation treatment LL carried out after said heat treatment, the model composition CT material or the Cover Form® material has an excellent surface hardness, which makes it capable of excellent resistance to scratches, shocks and abrasion. The UV irradiation LL has the effect of increasing the surface hardness of the component 1 obtained, by permanently cross-linking the system.

Moreover, when implemented, this product, which is the result of a mixture of liquid, base and activator phases, has very good wetability in its liquid phase which enables it to occupy all the porosities, slits and generally all the surface hollows and reliefs of a basic body with which it is in contact. The employment thereof as coating layer 20 thus conceals all the defects in the component or sub-component, basic body 16 or intermediate body 6A to it which is applied.

Each flexible mould 9 is preferably made of PDMS® material, which provides very high dimensional precision, and a perfect surface state.

Preferably, to obtain improved hardness of intermediate body 6A or of rigid component 1, second material 6, injected into cavity 14, is subjected during polymerisation to a temperature of less than 130° C., preferably of between 100° C. and 120° C. for 10 to 20 seconds. This heat treatment is preferably performed while the component or sub-component is still inside cavity 14.

In an advantageous variant, cooling to ambient temperature is carried out at least as abruptly as heating, for a duration of less than 20 seconds.

To obtain improved hardness of intermediate body 6A or of rigid component 1, after the injection of second moulding material 6, intermediate body 6A or component 1 is irradiated by UV radiation, either through mould 9 made in the form of a UV transparent mould, or after the removal of the polymerised intermediate body 6A or component 1 from cavity 14.

Advantageously, the first moulding material 5 is chosen to be transparent to ultraviolet radiation, which then makes it possible to irradiate intermediate body 6A or component 1 by ultraviolet radiation through basic body 16, in addition to irradiation through transparent mould 9 to obtain improved hardness of intermediate body 6A or of rigid component 1.

Preferably, a tightening force FS is applied to mould 9 and to basic body 16 during the injection of second moulding material 6 into cavity 14 and during polymerisation of second moulding material 6 to produce component 1.

The first moulding material 5 is preferably injected at high pressure, i.e. at a pressure of more than 100 MPa, but less than 150 MPa.

FIG. 4 illustrates an embodiment with several layers 20: a first layer 20A immediately totally or partially covers a base body 16 to form therewith an intermediate body 6A, as seen in FIG. 4A, and this first layer 20A is in turn totally or partially covered with a second peripheral layer 20B. It is clear that it is possible to form a compound with a higher number of layers, without departing from the invention.

Although the preferred object of the invention is to form transparent compounds, it is also possible to form compounds with inclusions of a decorative or technical nature, for example the display guide-marks for the hour guide-marks, which may be made in the thickness of a watch crystal, or on the side of the crystal facing the hands or display means of the timepiece, or guide-marks of ranges corresponding to particular displays, such as the power reserve or similar.

In the event that the shape of component 1 is irregular, there is made in at least one said mould 9 an injection and degassing capillary network 13, and second moulding material 6 is injected through the injection capillary network 13 into the transparent mould 9 concerned, so as to completely fill with second moulding material 6 a cavity 14 delimited by contact surface 10 of transparent mould 9, intermediate surface 7 of basic body 16, and edge 11 in sealed abutment via bearing surface 12 thereof on intermediate surface 7 or on intermediate edge 8.

In order to give component 1 particular physical and/or optical properties, functionalization structuring is performed. In the variant of FIG. 6, optical functionalization structuring is performed on intermediate surface 7, by creating striated sectors forming anisotropic optical diffusers.

In the variant of FIG. 7, mechanical functionalization structuring is performed on intermediate surface 7 by forming mortises 17 and/or tenons 18 substantially parallel to each other and substantially perpendicular to a plane tangent to bottom surface 3 or to intermediate surface 7 on the intersection between the extension of said mortises and tenons and the surface concerned.

In the variant of FIG. 8, mechanical functionalization structuring is performed on intermediate surface 7 by forming larger sections of basic body 16 in its areas of strong curvature than in its areas of lower curvature, and sections of added layers 20 are made with larger sections in its areas of strong curvature than in its areas of lower curvature.

Mechanical functionalization structuring is performed on intermediate surface 7 by forming areas of variable thickness of component 1 in its areas of lower curvature.

The choice of material having model composition CT or the Cover Form® material permits the deposition of 20 thin layers. Preferably, basic body 16 is coated to produce a component 1 with a combined thickness of the layer or layers 20 in the second material of between 10 and 50 microns.

Advantageously, when a multi-layered compound is formed, functionalization structuring is performed on several of the intermediate surfaces between said layers, as seen in FIG. 4, where intermediate surfaces 7 and 7A are structured in this manner.

In a particular application, at least one particular layer 20 among the layer or layers covering basic body 16 is structured, and at least one intermediate surface 7, so as to conceal or reveal the particular layer, according to the incident angle of observation by a user.

More specifically, the particular layer, a holographic material, undergoes pre-recording of a hologram using a coherent light source. In a particular application of the invention a HeNe laser or a laser diode is used, having a power of 1 to 4 mW.

A particularly advantageous variant of an inclusion of a technical nature for components 1 intended to form part of a timepiece movement consists in providing pouches or cavities when the mechanical functionalization structuring is performed on intermediate surface 7, such as for example the mortises 70 of FIG. 7, to enable the deposition therein of particles having particular properties prior to the application of the top layer. The properties of the material having model composition CT or of the Cover Form® material in the liquid state prior to polymerisation allow advantage to be taken of its capillarity, when it is mixed with these particles, to deposit the particles at the bottom of the mortises or similar. Very precise dimensioning of the mortises, striae, cavities, pouches or similar, and close to the particle size of the particles, makes it possible to retain particles of small particle size during injection of the liquid product intended to form the following layer, in a perfectly defined position.

Figure 9:
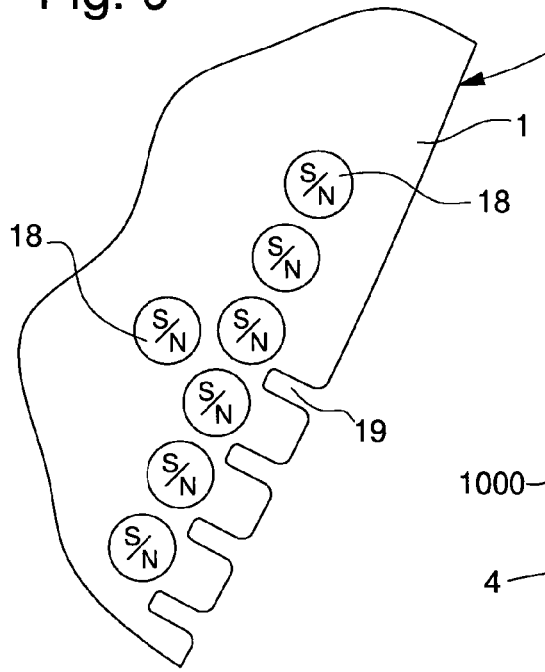
FIG. 9 shows a cross-section in proximity to the top surface of a component made according to a particular variant of the invention.
Figure 10:
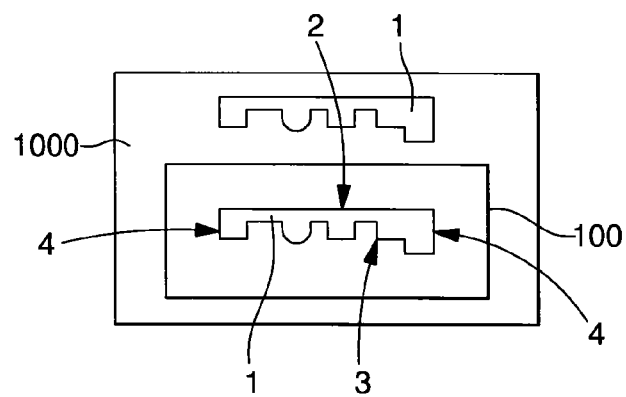
FIG. 10 shows block diagrams of a timepiece including at least one component made according to the invention.

More specifically, the choice of insertion of electrified or electrifiable and/or magnetised or magnetisable particles confers on the component 1 thereby formed particular properties of physical attraction and/or repulsion with other components of a timepiece movement, having complementary properties according to the desired effect. FIG. 9 thus illustrates a particular embodiment, wherein there is inserted into cavity 17 forming the mould, either prior to the injection of first moulding material 5, or during or after said injection, nodules 18 each including a electrifiable and/or magnetisable and/or electrified and/or magnetised core, particularly of the electret, ferrite, neodymium magnet type or similar. Electrification or magnetisation may be pre- or post-injection. FIG. 6 illustrates, for example, particles magnetised after the complete polymerisation of first moulding material 5, particularly of the material having model composition CT or the Cover Form® material. FIG. 6 also illustrates, in one area of top surface 2, cavities 19 arranged for lubrication. Contact surface 7 of plate 6 is then arranged accordingly.

Surface functionalization may also be attained by a surface nano-structuring process, such as photolithography, electron beam lithography, or electron-beam-induced growth. This structuring is advantageous for encryption and anti-counterfeiting marks.

In another variant, a lubricant material is mixed with first moulding material 5, in a similar manner to nodules 18 above.

The invention further concerns the application of this method to a timepiece component 1 selected from among: a crystal, crown, middle part of the case, main plate, bridge, wheel, escape wheel, pallets, bearing housing, shock absorber, although this list is not exhaustive.

The choice of a thin layer 20 of material having model composition CT or of Cover Form® material on a basic body 16 made of PMMA guarantees a first physicochemical reaction of diffusion at the interface with intermediate surface 7. The implementation of Cover Form® material, which is a bicomponent mixed in the liquid phase, enables all the porosities to be occupied, both in intermediate surface 7 and in the mould. This explains both the perfect surface states obtained, naturally within the limits of the quality of the moulds used, and the transparency of the component 1 obtained: in the absence of colorants, the surface joint is invisible, and it is impossible to discern the limit between the different materials with the naked eye. Cover Form® is suited to dying, which makes it possible to fabricate components having particular decorations, including multi-coloured decorations, made in the thickness thereof. It is also possible to form holograms.

The invention makes it possible to obtain components of greater transparency, having a greater surface than that of ordinary moulded plastic materials, and with a durable hardness. Scratch resistance is very good. By using as Cover Form® as the first moulding material 5, with heat treatment at less than 130° C. and UV hardening, a hardness is obtained which is rated 7H on the graphite pencil hardness scale, compared to a hardness of 2H for a standard PMMA treated with scratchproof coating, or to the HB hardness of a polyamide.

It is clear that the method described in detail above is a representative example of a family of methods for the user to implement according to the production means used.

In particular, in an automated method, it is possible advantageously to:
  close the mould so as to define a first chamber volume;
  inject the first material 5 therein;
  cool the material;
  partially reopen the mould, so as to create a second chamber of larger volume than that of the first volume, the difference between these volumes corresponding to the volume of a first layer 20A of second material 6;

inject a second material 6;

perform a hardening heat treatment;

perform UV irradiation for complementary hardening;

cool the compound.

repeat the operation as many times as there are layers to be superposed with the same mould profile.

It is of course possible during the process to change the counter-mould in order to modify the geometry of the component formed.

The facility of implementation of the invention also makes it possible, on the same component, to delimit some areas coated with second material 6, and others which are not coated, in order, according to the materials selected, to facilitate the implementation of other methods such as laser or ultrasonic welding or similar, which may be performed with higher quality on some metals.

Finally, the production cycle according to the invention is extremely fast: to fabricate a component with a single coating layer, the number of operations to be performed at the injection station is 4, compared to the 14 operations required to make a similar component in a conventional material coated with a scratch resistant coating.

The invention also concerns a timepiece movement 100 including at least one component 1 made according to this method.

The invention also concerns a timepiece 1000 including at least one component 1 made according to this method.

The invention claimed is:

1. A method for fabrication and mechanical and/or optical functionalization of an optically transparent timepiece component including a top surface and a bottom surface connected by an edge, the edge extending in thickness of the component, the method comprising:

choosing a first material which is either an optically transparent polymerizable material, or an acrylic polymer, or a methyl polymethacrylate;

choosing at least a second polymerizable molding material for making at least one layer of the component, in a model composition, wherein the second material includes, as a proportion of total:
trimethylolpropane tri (methacrylate): 78.0%,
pentaerythrityl tetraacrylate: 19.5%,
bis (4-tert-butylcyclohexyl) peroxydicarbonate: 0.5%,
1-benzoylcyclohexanol: 2.0%;

shaping a basic body of the component, in the first material, the basic body being of smaller volume than that of the component and extending between the bottom surface and an intermediate surface connected by an intermediate edge, and mechanical and/or optical functionalization and structuring of the intermediate surface is performed, either during the shaping of the basic body in a mold, or during re-machining after the shaping;

defining a number of layers to be superposed on the basic body to obtain the component;

for each layer, making a mold having a contact surface which is either negative of the top surface, or a surface delimiting a solid of smaller internal volume than a final volume of the component, the mold including an edge having a bearing surface arranged to cooperate in a complementary manner in abutment on the intermediate surface or on the intermediate edge, and, in a case of a plurality of the molds, the molds each define an external volume of an intermediate body delimited by a complementary intermediate surface of the contact surface of the mold concerned, the intermediate volumes being incorporated in each other;

at a distance from the intermediate surface corresponding to the thickness required for the component, and exactly positioned in relation to the intermediate surface, positioning the mold with the contact surface thereof facing the intermediate surface of the basic body, with the bearing surface in sealed contact with the intermediate surface or with the intermediate edge;

injecting the second molding material, to completely fill with the second molding material a cavity delimited by the contact surface of the mold, the intermediate surface of the basic body, and the edge in sealed abutment via the bearing surface thereof on the intermediate surface or on the intermediate edge;

leaving the second material injected into the cavity to polymerize until polymerization, to obtain either the component formed by assembling the basic body to at least the layer, or an intermediate body delimited by a complementary intermediate surface of the contact surface of the mold;

removing the mold;

repeating operations of forming a layer each time with a new mold whose internal volume is greater than a volume of the intermediate body obtained by a preceding mold, until obtaining the component with a final volume thereof.

2. The method according to claim 1, wherein a methyl polymethacrylate is chosen as the first material.

3. The method according to claim 1, wherein the second material, injected into the cavity, is subjected during polymerization to a temperature between 100° C. and 120° C. for 10 to 20 seconds.

4. The method according to claim 1, wherein, after the injecting the second molding material, the intermediate body or the component is irradiated by ultraviolet radiation, either through the mold made in a form of a mold transparent to ultraviolet radiation or after the removing the intermediate body or the polymerized component from the cavity, to obtain improved hardness of the intermediate body or of the component.

5. The method according to claim 4, wherein the first material is chosen to be transparent to ultraviolet radiation, and the intermediate body or the component is irradiated by ultraviolet radiation through the basic body, in addition to the irradiation through the transparent mold to obtain improved hardness of the intermediate body or of the rigid component.

6. The method according to claim 1, wherein a tightening force is applied to the mold and to the basic body during the injecting the second molding material into the cavity and during polymerization of the second molding material to produce the component.

7. The method according to claim 1, wherein the component is made with the top surface plane, and the mold is selected to be transparent to ultraviolet radiation with at least the contact surface thereof plane.

8. The method according to claim 1, wherein there is made in at least one of the mold an injection and degassing capillary network, and the second molding material is injected through the injection capillary network into the mold concerned, to completely fill with the second molding material a cavity delimited by the contact surface of the transparent mold, the intermediate surface of the basic body, and the edge in sealed abutment via the bearing surface thereof on the intermediate surface or on the intermediate edge.

9. The method according to claim 1, wherein the injecting the first material is performed at a pressure of more than 100 MPa.

10. The method according to claim 1, wherein optical functionalization structuring is performed on the intermediate surface, by creating striated sectors forming anisotropic optical diffusers.

11. The method according to claim 1, wherein mechanical functionalization structuring is performed on the intermediate surface by forming mortises and/or tenons substantially parallel to each other and substantially perpendicular to a plane tangent to the bottom surface or to the intermediate surface on an intersection between an extension of the mortises and tenons and the surface concerned.

12. The method according to claim 1, wherein mechanical functionalization structuring is performed on the intermediate surface by forming smaller sections of the basic body in areas of strong curvature than in areas of lower curvature therein, and sections of the added layers are made with larger sections in areas of strong curvature than in the areas of lower curvature.

13. The method according to claim 1, wherein mechanical functionalization structuring is performed on the intermediate surface by forming areas of variable thickness of the component in areas of lower curvature therein.

14. The method according to claim 1, wherein mechanical functionalization structuring is performed on at least one the intermediate surface to arrange a relief pattern with hollows of dimensions close to a particle size of electrified or electrifiable and/or magnetized or magnetizable particles, which are deposited mixed with the second material in a liquid state, prior to application of a top layer of the second material.

15. The method according to claim 1, wherein the basic body is coated to produce the component with a combined thickness of second material in the layer or layers between 10 and 50 microns.

16. The method according to claim 1, wherein at least one particular layer among the layer or layers covering the basic body is structured, and at least one the intermediate surface to conceal or reveal the particular layer, according to an incident angle of observation of the component by a user.

17. The application of the method according to claim 1 to fabrication of a timepiece component selected from among: a crystal, crown, middle part of a case, plate, bridge, escape wheel, pallets, oscillating weight, bearing housing, shock absorber.

* * * * *